May 3, 1966 E. G. CHEAK 3,249,169
TRACTOR AND TRAILER INTERCONNECTION AND SUSPENSION
Filed July 8, 1963 4 Sheets-Sheet 1
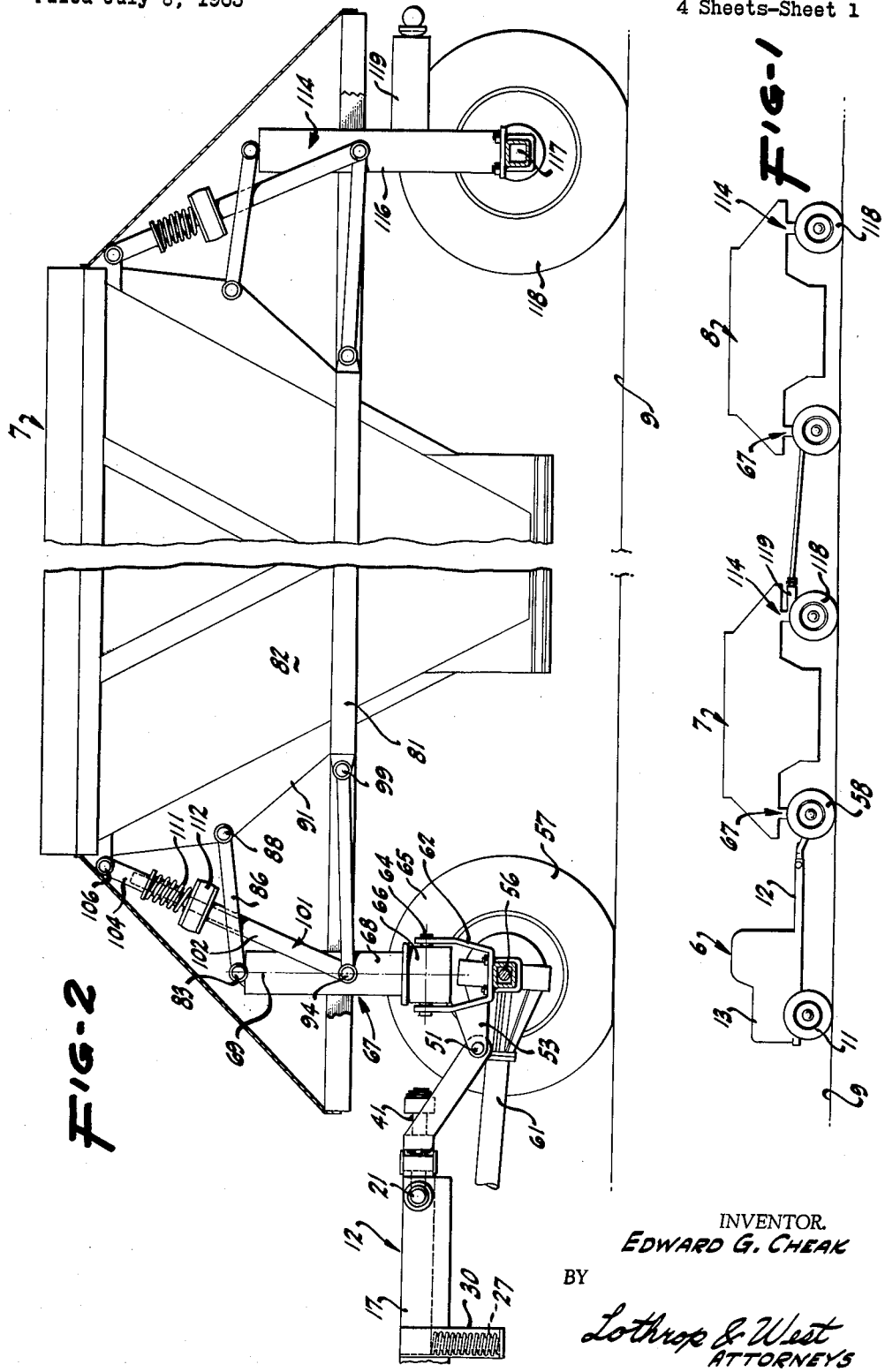
INVENTOR.
EDWARD G. CHEAK
BY
Lothrop & West
ATTORNEYS

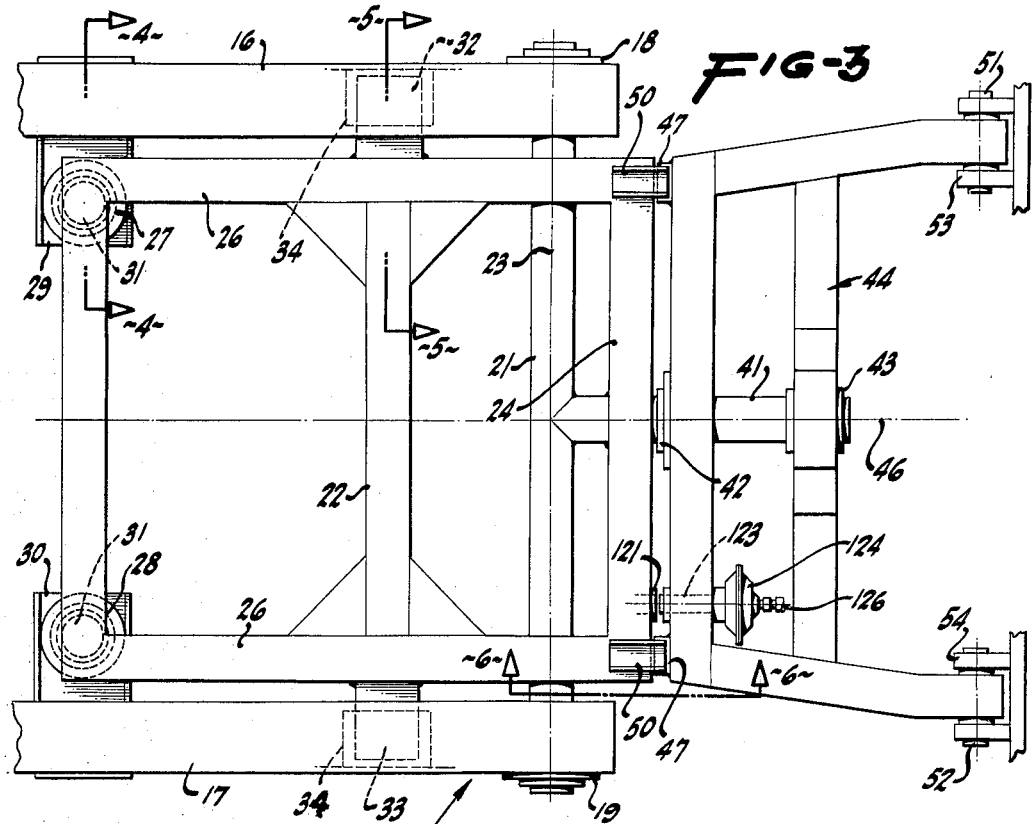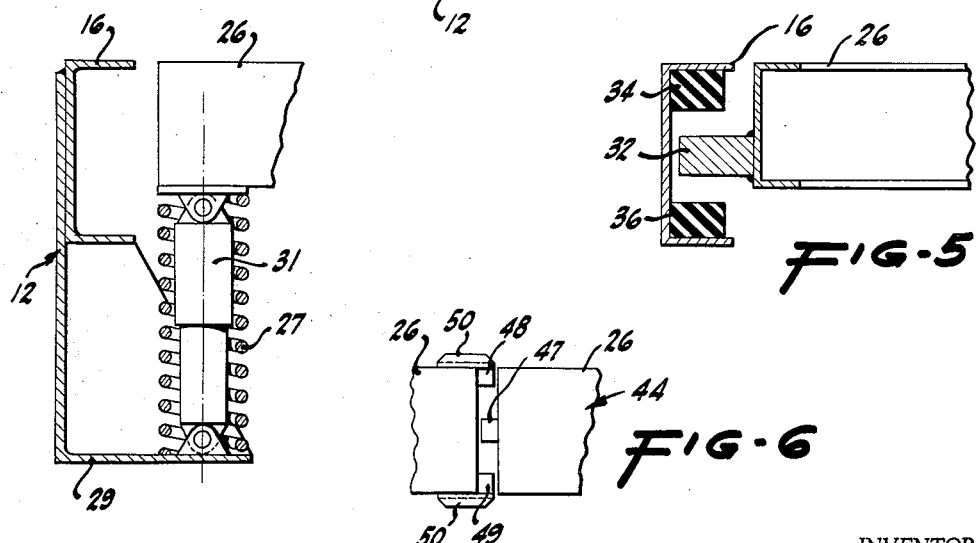

INVENTOR.
EDWARD G. CHEAK
BY
Lothrop & West
ATTORNEYS

United States Patent Office 3,249,169
Patented May 3, 1966

3,249,169
TRACTOR AND TRAILER INTERCONNECTION
AND SUSPENSION
Edward G. Cheak, 36 Dean Way, Chico, Calif.
Filed July 8, 1963, Ser. No. 293,467
7 Claims. (Cl. 180—11)

My invention relates primarily to automotive vehicles and particularly combinations of automotive vehicles in which the draft machine is a tractor and the drawn machine is a trailer. These combinations include one tractor and one or more trailers and are utilized customarily for heavy hauling.

In the operation of devices of this sort, the driving and suspension mechanism must be arranged for satisfactory operation when the vehicles are running light. This requires a very wide range of spring or resilient suspension response in order to cut down the jarring and shaking of the vehicles and their loads and also to cut down corresponding damage to the roadway.

It is also of considerable importance that the driving and maneuvering connections be such that the drawn vehicle or vehicles always track properly and handle well and in order that there will be appropriate traction on the driving wheels whether the trailing vehicle is loaded or is light.

It is therefore an object of my invention to provide a tractor and trailer interconnection and suspension which takes care of the foregoing matters.

Another object of the invention is to provide a tractor and trailer interconnection and suspension in which the load on the trailer is effective to increase the traction of the tractor.

Another object of the invention is to provide a tractor and trailer interconnection and suspension which can be utilized with one or more trailer vehicles.

Another object of the invention is to provide a tractor and trailer interconnection and suspension in which the tracking or steering of the vehicles is carefully controlled.

A still further object of the invention is to provide a tractor and trailer interconnection and suspension in which the load distribution is such as to avoid damage to the lading and overloading of the roadway.

A still further object of the invention is in general to improve a tractor and trailer interconnection and suspension.

Other objects together with the foregoing are attained in the embodiments of the invention described in the accompanying description and illustrated in the accompaning drawings, in which:

FIGURE 1 is a side elevation of my tractor and trailer interconnection and suspension as incorporated in a typical tractor and multiple trailer arrangement;

FIGURE 2 is a side elevation, portions being broken away to show the interior construction, of the rear of a tractor and the important portion of a trailer constructed in accordance with the invention;

FIGURE 3 is a plan of a portion of the rearward end of the tractor and a part of the driving axle;

FIGURE 4 is a cross section, the plane of which is indicated by the line 4—4 of FIGURE 3;

FIGURE 5 is a cross section, the plane of which is indicated by line 5—5 of FIGURE 3;

FIGURE 6 is a detail showing in side elevation a portion of the structure as illustrated by the line 6—6 of FIGURE 3;

Figure 7:
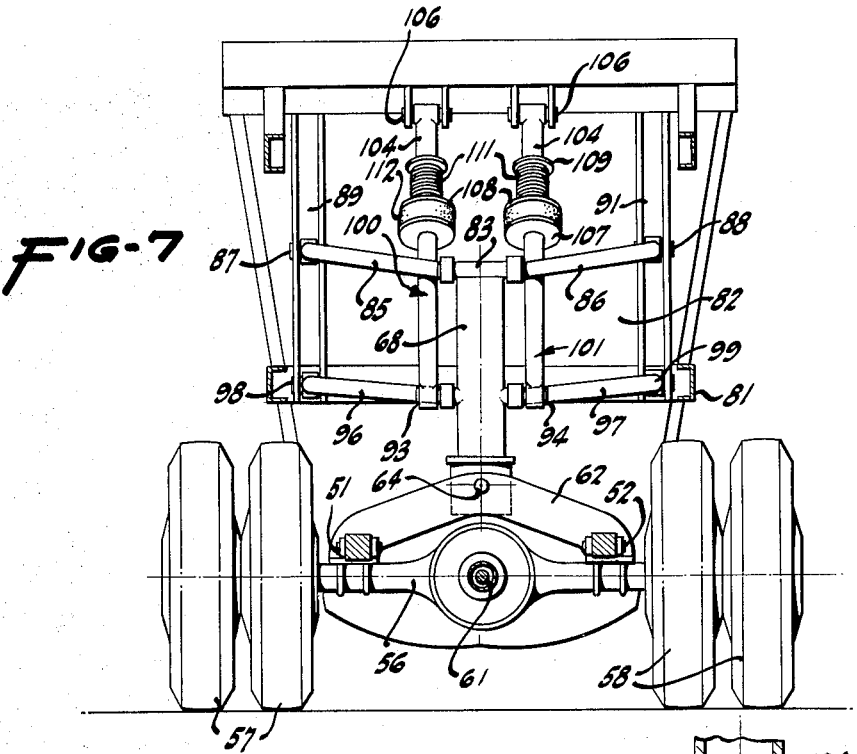
FIGURE 7 is a front elevation of the driving axle and forward portion of a trailer, certain parts being in cross section.

While the tractor and trailer interconnection and suspension pursuant to the invention can be incorporated in a number of different ways, a typical use is in connection with a tractor vehicle 6, a primary trailer vehicle 7 and a secondary trailer vehicle 8, all operating on a highway 9 or working on a suitable off-highway road. The tractor 6 is substantially conventional in the arrangement of its forward portion and includes front dirigible wheels 11 supporting a main frame 12 on which a power plant 13 is mounted. The frame 12 includes a pair of side channels 16 and 17 facing each other.

Adjacent their rearward ends of the side rails 16 and 17 carry bearing mountings 18 and 19. Journalled in the bearings 18 and 19 is a cross shaft 21 serving as a support for a platform 22 so that the platform can rotate about a traverse horizontal axis 23 relative to the main frame. The platform is comprised of a number of angles and shapes to form a rigid, generally rectangular structure. A portion 24 of the platform extends rearwardly, whereas another portion 26 extends forwardly to engage a pair of coil springs 27 and 28 carried on brackets 29 and 30 on the frame rails 16 and 17, so that weight on the platform is transmitted through the springs 27 and 28 to the main tractor frame. Shock absorbers 31 assist in the control of the spring operation. The amount of movement of the platform relative to the frame around the axis 23 is limited by a pair of projections 32 and 33 extending from the sides of the platform and travelling between a pair of blocks 34 and 36 of rubber or a similar elastomeric material. Before the springs 27 and 28 bottom or expand excessively, the projections 32 and 33 abut the appropriate pads and the motion is promptly cushioned and arrested.

Extending from the platform portion 24 rearwardly and connected to the cross shaft 21 is a longitudinal shaft 41 carried in journals 42 and 43 mounted in the central portion of a yoke 44. The journals 42 and 43 allow for relative pivotal motion between the yoke 44 and the platform and main frame about a longitudinal horizontal axis 46. Here again, the relative motion about the axis 46 is limited by projections 47 (FIGURE 6) which lie between rubberized blocks 48 and 49 on brackets 50 extending from the platform, so that while there is free oscillation about the axis 46 in an intermediate range, the movement is ultimately cushioned and arrested by the blocks 48 and 49.

The yoke 44 in its trailing portion is not only bifurcated, but is rotatably engaged by pivot pins 51 and 52 with brackets 53 and 54 ultimately connected to a driving axle 56 of the customary kind, preferably having dual drive wheels 57 and 58 at each end. The driving axle 56 is connected to the power plant in the tractor by means of the customary drive shaft 61.

In accordance with the invention, the brackets 53 and 54, although connected to the driving axle 56, are not immediately mounted thereon. As particularly shown in FIGURE 7, clamped to the housing of the driving axle 56 is an arch member 62 having a separated central portion. The forward member of the central portion carries the brackets 53 and 54. The arch member 62 at its upper central area engages a pivot pin 64 disposed with its longitudinal axis in a horizontal plane nearly or exactly in alignment with the axis 46. Precise alignment is not essential, although it is preferred.

Disposed on the pivot pin 64 is the lower part 66 of a connecting means 67 which also includes an upper part 68. The parts 66 and 68 of the connector are rotatable relative to each other about a vertical axis 69 which preferably intersects the horizontal axis of the driving axle 56 and also intersects the longitudinal pivotal axis 65. As especially illustrated in FIGURE 8, the lower member 66 is provided with a plurality of internal threads 71 engaging external threads 72 at the lower end of the upper member 68. The interior of the members 66 and 68 is hollow and serves as a reservoir for oil 73 or comparable lubricant admitted to the interengaging threads 71 and 72 through passageways 74. A packing 76 precludes undue leakage of the oil. Due to the movement of the threads, there is a slight raising and lowering of the upper member relative to the lower member during rotation. The threads afford a large area for load transmission between the upper and lower portions of the structure.

The trailer 7 includes a main frame 81 comprised of suitable shapes and plates and in the present arrangement mounts a dump body 82. This is substantially symmetrical at both ends so that a description of the forward end applies equally to the rearward end. The upper member 68 at its top carries a cross pin 83 extending in a horizontal transverse direction. At the opposite ends of the pin, links 85 and 86 (FIGURE 7) extend rearwardly and are themselves connected by appropriate pivot pins 87 and 88 to channels 89 and 91 included in the forward portion of the body 82.

Figure 9:
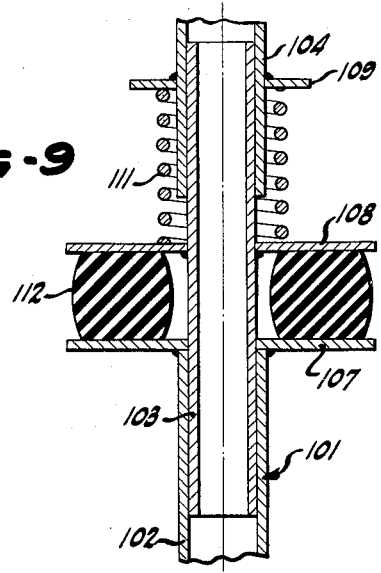
FIGURE 9 is a cross section showing in detail the construction of one of the cushion elements.

Intermediate its height, the upper member 68 is provided with a pair of projecting pivot pins 93 and 94, each of which receives the forward end of a pair of lower links 96 and 97. At their rearward ends, the links 96 and 97 are connected by pivot pins 98 and 99 to the lower part of the channels 89 and 91. Since the various pivot axes are all parallel, there is afforded an appropriate relative vertical motion between the upper member 68 and the frame 81. Load is transmitted from the frame 81 to the upper member 68 by duplicate telescoping struts 100 and 101. The struts are alike and are particularly illustrated in FIGURE 9. At its lower end the telescoping strut 101 includes a tube 102 conveniently pivoted on the subjacent pin, such as 94. Operating within the tube 102 is an internal tube 103 internally slidable in an upper tube 104 having a pivot connection 106 at its upper end to a part of the frame 81. In this fashion the tubes 102, 103 and 104 are all axially movable relative to each other.

Extending outwardly from the tube 102 is a plate 107 facing a similar plate 108 welded to the internal tube 103. A similar plate 109 is welded to the upper tube 104. A coil spring 111 is interposed between the plates 108 and 109 and an elastomeric toroid 112 is interposed between the plates 107 and 108. The elastomeric toroid 112 can be of rubber alone or can be a rubber walled chamber enclosing air under pressure. In any event, the mechanism is such that when a relatively light load is imposed on the support 68 by the frame 81, the spring 111 yields more or less with the tube 103 working within the tube 104. When the load increases substantially, then the tube 104 is depressed until its lower end abuts the upper face of the plate 108. This collapses the spring 111 and makes the tubes 104 and 103 in effect a solid member. Under these conditions, the additional load is transmitted directly from the tube 104 and the place 108 to the elastomeric member 112 for transmission to the lower tube 102. By this means, I provide an appropriate support or suspension so that the vehicle rides and tracks well when under light load, since the springs 111 take the thrust, whereas under extremely heavy loads, the light spring 111 is out of action, substantially, and the elastomeric member 112 provides the appropriate suspending agency.

While the structure generally designated 114 at the rearward end of the frame 81 is similar to the one described in front, it does not pivot on a vertical axis and does not terminate in a driving axle. In this location, the upright member 116 is supported on a dead axle 117 carrying rear ground-engaging wheels 118. The upright 116 likewise carries a hitch 119 for coupling a subsequent trailer, if desired.

The arrangement as so far described is one in which the vertical load on the trailer is transmitted in part to the driving axle along with part of the load from the tractor, so that the driving wheels 57 and 58 are always provided with a loading which is appropriate to the tractive effort they must expend. Stated differently, it can be considered that the trailer is a front drive vehicle.

Under some circumstances, it is desired to lock together the trailer and tractor so that there is no free oscillation about the axis 46. As particularly shown in FIGURE 3, I provide a socket 121 on the platform 22 and a pin 123 on the yoke 44 arranged to be actuated by an air chamber 124 of the customary sort. The chamber is either supplied with air under pressure or is connected to the atmosphere through a conduit 126 extending to an appropriate valve. Normally the pin 123 is retracted and there can be free motion. When the parts are to be locked together, pressure is supplied to the chamber 124, the pin 123 is projected into the socket 121, and the yoke 44 and platform 22 are interlocked so that there is no relative oscillation therebetween about the axis 46.

Figure 8:
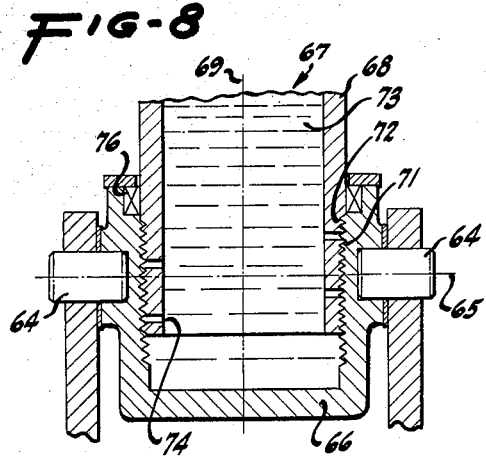
FIGURE 8 is a detail showing in transverse cross section the lower end of one form of swivel or pivot arrangement.
Figure 10:
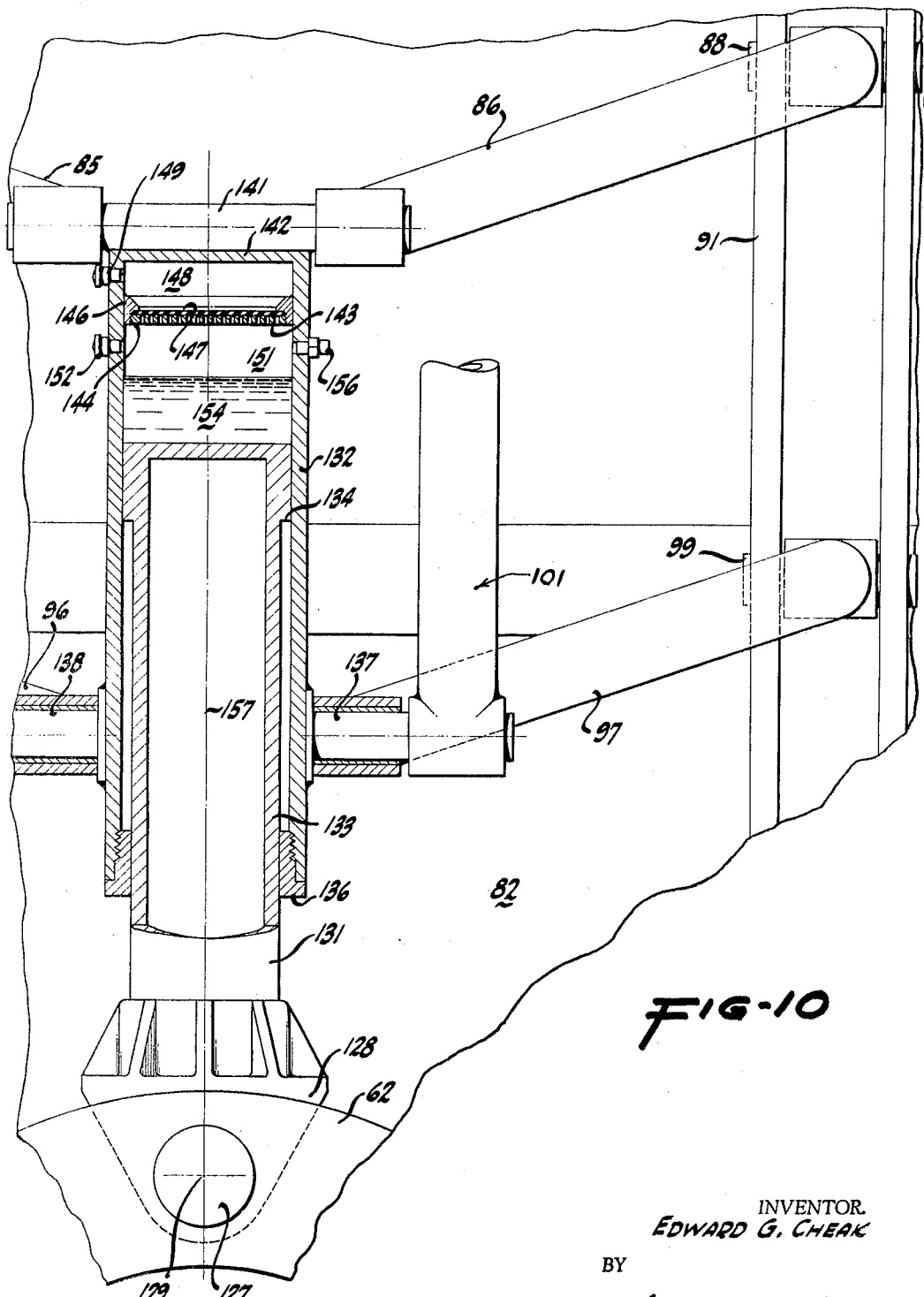
FIGURE 10 is an enlarged cross section on a vertical transverse plane showing a modified form of swivel or pivoting and suspension mechanism.

Under some conditions of operation, I prefer to utilize a slightly different pivoting and suspending structure in lieu of that shown primarily in FIGURE 8. In this instance, as illustrated in FIGURE 10, the arch 62 carries a through pivot pin 127 engaging a connector 128 for relative oscillation about a central axis 129 which preferably coincides with the axis 65. The connector 128 is fixed at the lower end of a hollow plunger 131 reciprocable within a cylinder 132. The plunger has a reduced portion 133 to afford a shoulder 134 in the path of which a seal and stop plug 136 is disposed. The cylinder 132 carries a pair of projecting lower pins 137 and 138 pivotally connected with the lower links 96 and 97, as before, and also carries a top cross pin 141 at its upper end pivotally connected to the links 85 and 86, as before.

Spanning the upper portion of the cylinder 132, which is closed by a top plate 142, is a perforated diaphragm plate 143 held in place by a screw connection 144 to a shouldered mounting ring 146 welded into the upper end of the cylinder 132. Appropriately secured in position by the removable diaphragm plate is an elastomeric diaphragm 147, preferably of rubber. A closed chamber 148 is thus provided above the diaphragm 147 and the top 142. The chamber 148 can be provided with air under any desired pressure through an air valve 149. Somewhat similarly, air under a different and usually lower pressure can be provided to the chamber 151 below the diaphragm through an air fitting 152. Additionally, a pool 154 of oil to any selected depth is provided within the cylinder above the piston, the depth of oil changing the volume of the air in the chamber 151. Oil is added or withdrawn through a fitting 156.

In the operation of this structure, oil is supplied to a selected level and air under approximately thirty pounds per square inch pressure is introduced into the chamber 151. Air under about three hundred pounds per square inch pressure is provided in the chamber 148. Under light load conditions, as the plunger 131 reciprocates within the cylinder, the pressure in the chamber 151 varies from time to time and more or less rapidly, depending upon the oil volume, but does not greatly exceed the normal pressure. Thus, the diaphragm 147 is not deflected. On the other hand, when the vehicle is heavily loaded, then the plunger moves into the cylinder sufficiently to raise the pressure in the chamber 151 to and above three hundred pounds per square inch.

Under these circumstances, when the pressure on the nether side of the diaphragm 147 exceeds the upper chamber, the diaphragm is lifted and brings the capacity of the chamber 148 into play. Finally, if the level of the oil pool 154 is raised sufficiently, the oil is throttled through the openings in the diaphragm plate 143. The arrangement affords an appropriate suspension for the vehicle whether under light load or under heavy load. The piston and plunger serve also as the pivotal interconnection for relative rotation between the driving axle and the trailer frame about the vertical axis 157.

What is claimed is:

1. A tractor and trailer interconnection and suspension comprising a tractor frame supported on wheels at its front end, a driving axle, means on said tractor frame connected to drive said driving axle, a yoke, means for fastening said yoke to said axle to pivot about a transverse horizontal axis, a platform, means for mounting said platform on said frame to pivot about a transverse horizontal axis at the rear of said tractor frame and between the ends of said platform, means for connecting said yoke to the trailing end of said platform for rotation about a longitudinal horizontal axis, springs supporting the forward end of said platform on said tractor frame, a trailer frame supported on wheels at its rearward end, a pivot connector having upper and lower parts relatively rotatable about a vertical axis, means for supporting the forward end of said trailer frame on said upper part, and means for connecting said lower part to said driving axle for movement about a longitudinal horizontal axis.

2. A tractor and trailer interconnection and suspension comprising a tractor frame supported on wheels at its front end, a driving axle, means on said tractor frame connected to drive said driving axle, a platform, means for mounting said platform on said frame to pivot about a transverse horizontal axis at the rear of said tractor frame and between the ends of said platform, load springs interposed between said tractor frame and said platform, a yoke, means for connecting said yoke to the trailing end of said platform for rotation about a longitudinal horizntal axis, means for connecting said yoke to said axle to pivot about a transverse horizontal axis, a trailer frame supported on wheels at its rearward end, a pivot connector having upper and lower parts relatively rotatable about a vertical axis, means for connecting said lower part to said driving axle for movement about a longitudinal horizontal axis, and means for connecting said upper part to said tractor frame for relative vertical movement.

3. A tractor and trailer interconnection and suspension comprising a tractor frame supported on wheels at its front end, a driving axle, means on said tractor frame connected to drive said driving axle, a platform within said tractor frame, means for connecting said platform to said tractor frame for pivotal movement about a transverse horizontal axis, load springs interposed between said platform and said tractor frame, a yoke extending behind said tractor frame, means for connecting said yoke to said platform for rotation about a longitudinal horizontal axis, means for connecting said yoke to said driving axle for pivotal movement about a transverse horizontal axis, a trailer frame supported on wheels at its rearward end, and means for supporting said trailer frame on said driving axle for pivotal movement about a longitudinal horizontal axis approximately coincident with the longitudinal horizontal axis of said yoke.

4. A tractor and trailer interconnection as in claim 2 including locking means for holding said yoke and said platform against relative pivotal movement about said longitudinal horizontal axis.

5. A tractor and trailer interconnection and suspension as in claim 3 in which said means for supporting said trailer frame on said driving axle includes upper and lower parts connected for relative rotation about a vertical axis and also includes means for relative vertical motion between said tractor frame and said driving axle.

6. A tractor and trailer interconnection and suspension as in claim 5 including means for resiliently supporting said trailer frame on said driving axle.

7. A tractor and trailer interconnection and suspension as in claim 5 wherein said upper and lower parts are in threaded engagement for relative rotational movement about and relative translational movement along said vertical axis.

References Cited by the Examiner
UNITED STATES PATENTS

| | | | |
|---|---|---|---|
| 1,018,248 | 2/1912 | Martin | 180—11 |
| 1,296,781 | 3/1919 | Edmonds | 180—11 |
| 1,323,739 | 12/1919 | Buck | 180—11 |
| 1,948,922 | 2/1934 | Jyrch | 280—106.5 |
| 2,089,290 | 8/1937 | Nabors | 280—116 |
| 2,366,166 | 1/1945 | Willock | 180—11 X |
| 3,009,713 | 11/1961 | Barker et al. | 280—116 |

BENJAMIN HERSH, *Primary Examiner.*

A. HARRY LEVY, R. C. PODWIL,
*Assistant Examiners.*